US008705741B2

(12) United States Patent
Voruganti et al.

(10) Patent No.: US 8,705,741 B2
(45) Date of Patent: Apr. 22, 2014

(54) SUBCHANNEL SECURITY AT THE OPTICAL LAYER

(75) Inventors: Pavan Voruganti, San Jose, CA (US); Karl May, Menlo Park, CA (US)

(73) Assignee: Vello Systems, Inc., Menlo Park, CA (US)

( * ) Notice: Subject to any disclaimer, the term of this patent is extended or adjusted under 35 U.S.C. 154(b) by 226 days.

(21) Appl. No.: 13/031,594

(22) Filed: Feb. 21, 2011

(65) Prior Publication Data

US 2011/0206203 A1 Aug. 25, 2011

Related U.S. Application Data

(60) Provisional application No. 61/306,925, filed on Feb. 22, 2010.

(51) Int. Cl.
*H04L 29/06* (2006.01)

(52) U.S. Cl.
USPC ............................ 380/256; 380/255; 380/268

(58) Field of Classification Search
USPC ......................................... 380/256, 255, 268
See application file for complete search history.

(56) References Cited

U.S. PATENT DOCUMENTS

| | | | |
|---|---|---|---|
| 4,164,787 | A | 8/1979 | Aranguren |
| 5,062,684 | A | 11/1991 | Clayton et al. |
| 5,101,450 | A | 3/1992 | Olshansky |
| 5,239,401 | A | 8/1993 | Olshansky |
| 5,301,058 | A | 4/1994 | Olshansky |
| 5,333,000 | A | 7/1994 | Hietala et al. |
| 5,390,188 | A | 2/1995 | Dawson |
| 5,442,623 | A | 8/1995 | Wu |
| 5,479,082 | A | 12/1995 | Calvani et al. |

(Continued)

FOREIGN PATENT DOCUMENTS

| | | |
|---|---|---|
| DE | 19828614 | 12/1999 |
| EP | 0113379 | 7/1984 |

(Continued)

OTHER PUBLICATIONS

Adamzyk, et al., “All-optical output-port contention resilution using subcarrier-Multiplexing,” Optical Fiber Communications Cofnerence 2000, Mar. 7-10, 20000, pp. 332-334.

(Continued)

*Primary Examiner* — Bradley Holder
(74) *Attorney, Agent, or Firm* — Daniel Siegel; Michael K. Bosworth; IPxLaw Group LLP

(57) ABSTRACT

The present invention includes various novel techniques, apparatus, and systems for optical WDM communications that involve dynamically modifying certain aspects of the WDM transmission (and corresponding receive) process at the optical (physical) layer to significantly enhance data/network security. These various dynamic modifications can be employed individually or in combination to provide even greater security depending upon the desired application and design tradeoffs. WDM transmission steps typically include encoding the client signals, mapping them to one or more subchannels within or across ITU channels, modulating them onto subcarrier frequencies, and multiplexing them together for optical transmission. By dynamically modifying one or more of these processing steps over time (in addition to any encryption of the underlying client signals), the current invention provides additional security at the physical (optical) layer of an optical network and thus greatly enhances overall network security.

12 Claims, 10 Drawing Sheets

(56) References Cited

U.S. PATENT DOCUMENTS

| | | | | |
|---|---|---|---|---|
| 5,509,093 | A | 4/1996 | Miller et al. | |
| 5,539,559 | A | 7/1996 | Cisneros et al. | |
| 5,546,210 | A | 8/1996 | Chraplyvy et al. | |
| 5,596,436 | A | 1/1997 | Sargis et al. | |
| 5,600,466 | A | 2/1997 | Tsushima et al. | |
| 5,608,825 | A | 3/1997 | Ip | |
| 5,617,233 | A | 4/1997 | Boncek | |
| 5,625,478 | A | 4/1997 | Doerr et al. | |
| 5,663,820 | A | 9/1997 | Shiragaki | |
| 5,663,968 | A | 9/1997 | Heuer | |
| 5,680,235 | A | 10/1997 | Johansson | |
| 5,696,614 | A | 12/1997 | Ishikawa et al. | |
| 5,710,650 | A | 1/1998 | Dugan | |
| 5,712,716 | A | 1/1998 | Vanoli et al. | |
| 5,717,795 | A | 2/1998 | Sharma et al. | |
| 5,734,493 | A | 3/1998 | Jopson | |
| 5,742,416 | A | 4/1998 | Mizrahi | |
| 5,745,273 | A | 4/1998 | Jopson | |
| 5,764,821 | A | 6/1998 | Glance | |
| 5,778,118 | A | 7/1998 | Sridhar | |
| 5,781,327 | A | 7/1998 | Brock et al. | |
| 5,784,184 | A | 7/1998 | Alexander et al. | |
| 5,786,913 | A | 7/1998 | Pfeiffer | |
| 5,796,501 | A | 8/1998 | Sotom et al. | |
| 5,822,095 | A | 10/1998 | Taga et al. | |
| 5,838,475 | A | 11/1998 | Takeyari et al. | |
| 5,870,212 | A | 2/1999 | Nathan et al. | |
| 5,880,870 | A | 3/1999 | Sieben et al. | |
| 5,896,212 | A | 4/1999 | Sotom et al. | |
| 5,917,638 | A | 6/1999 | Franck et al. | |
| 5,923,449 | A | 7/1999 | Doerr et al. | |
| 5,938,309 | A | 8/1999 | Taylor | |
| 5,940,197 | A | 8/1999 | Ryu | |
| 5,949,273 | A | 9/1999 | Mourick et al. | |
| 5,949,560 | A | 9/1999 | Roberts et al. | |
| 5,953,141 | A | 9/1999 | Liu et al. | |
| 5,982,518 | A | 11/1999 | Mizarahi | |
| 5,982,963 | A | 11/1999 | Feng et al. | |
| 6,008,931 | A | 12/1999 | Von Helmolt et al. | |
| 6,023,359 | A | 2/2000 | Asahi | |
| 6,035,080 | A | 3/2000 | Henry et al. | |
| 6,069,732 | A | 5/2000 | Koch et al. | |
| 6,084,694 | A | 7/2000 | Milton et al. | |
| 6,088,141 | A | 7/2000 | Merli et al. | |
| 6,118,566 | A | 9/2000 | Price et al. | |
| 6,130,766 | A | 10/2000 | Cao | |
| 6,163,553 | A | 12/2000 | Pfeiffer | |
| 6,191,854 | B1 | 2/2001 | Grasso et al. | |
| 6,192,173 | B1 | 2/2001 | Solheim et al. | |
| 6,195,186 | B1 | 2/2001 | Asahi | |
| 6,195,351 | B1 | 2/2001 | Hiscock et al. | |
| 6,201,909 | B1 | 3/2001 | Kewitsch et al. | |
| 6,208,441 | B1 | 3/2001 | Jones et al. | |
| 6,211,980 | B1 | 4/2001 | Terahara | |
| 6,222,654 | B1 | 4/2001 | Frigo | |
| 6,259,836 | B1 | 7/2001 | Dodds | |
| 6,271,946 | B1 | 8/2001 | Chang et al. | |
| 6,285,479 | B1 | 9/2001 | Okazaki et al. | |
| 6,339,663 | B1 | 1/2002 | Leng et al. | |
| 6,351,323 | B1 | 2/2002 | Onaka et al. | |
| 6,369,923 | B1 | 4/2002 | Kuo et al. | |
| 6,385,204 | B1 | 5/2002 | Hoefelmeyer et al. | |
| 6,404,535 | B1 | 6/2002 | Leight | |
| 6,414,765 | B1 | 7/2002 | Li et al. | |
| 6,433,904 | B1 | 8/2002 | Swanson et al. | |
| 6,466,342 | B1 | 10/2002 | Frigo et al. | |
| 6,525,857 | B1 | 2/2003 | Way et al. | |
| 6,556,744 | B1 | 4/2003 | Brimacombe et al. | |
| 6,560,252 | B1 | 5/2003 | Colbourne et al. | |
| 6,580,537 | B1 | 6/2003 | Chang et al. | |
| 6,590,681 | B1 | 7/2003 | Egnell et al. | |
| 6,657,952 | B1 | 12/2003 | Shimomura et al. | |
| 6,661,976 | B1 | 12/2003 | Gnauck et al. | |
| 6,701,085 | B1 | 3/2004 | Muller | |
| 6,788,899 | B2 | 9/2004 | Way | |
| 6,845,109 | B2 | 1/2005 | Lee et al. | |
| 6,891,981 | B2 | 5/2005 | Price et al. | |
| 6,970,655 | B2 | 11/2005 | Ono et al. | |
| 6,990,624 | B2 * | 1/2006 | Dohmen et al. | 714/785 |
| 7,003,231 | B2 | 2/2006 | Way et al. | |
| 7,024,112 | B2 | 4/2006 | Way | |
| 7,068,949 | B2 | 6/2006 | Jung et al. | |
| 7,120,359 | B2 | 10/2006 | Way | |
| 7,206,520 | B2 | 4/2007 | Way et al. | |
| 7,257,325 | B1 | 8/2007 | Barbarossa | |
| 7,509,564 | B2 * | 3/2009 | Dohmen et al. | 714/782 |
| 8,290,371 | B2 * | 10/2012 | Etemad et al. | 398/79 |
| 2002/0012148 | A1 | 1/2002 | Oksanen | |
| 2002/0015553 | A1 | 2/2002 | Claringburn et al. | |
| 2002/0023170 | A1 | 2/2002 | Seaman et al. | |
| 2002/0030877 | A1 | 3/2002 | Way et al. | |
| 2002/0063928 | A1 | 5/2002 | Hansen et al. | |
| 2002/0067523 | A1 | 6/2002 | Way | |
| 2002/0080440 | A1 | 6/2002 | Li et al. | |
| 2002/0114034 | A1 | 8/2002 | Way | |
| 2002/0126350 | A1 | 9/2002 | Sato et al. | |
| 2002/0135838 | A1 | 9/2002 | Way | |
| 2003/0025961 | A1 | 2/2003 | Way | |
| 2003/0067643 | A1 | 4/2003 | Lee et al. | |
| 2003/0106014 | A1 * | 6/2003 | Dohmen et al. | 714/785 |
| 2003/0165119 | A1 | 9/2003 | Hsu | |
| 2003/0169470 | A1 | 9/2003 | Alagar et al. | |
| 2003/0180047 | A1 | 9/2003 | Way | |
| 2003/0185248 | A1 | 10/2003 | Klipper et al. | |
| 2003/0215232 | A1 | 11/2003 | Jahn et al. | |
| 2004/0208561 | A1 | 10/2004 | Kinoshita et al. | |
| 2004/0208586 | A1 | 10/2004 | Kinoshita | |
| 2004/0218526 | A1 | 11/2004 | Kim et al. | |
| 2005/0002625 | A1 * | 1/2005 | Vig | 385/115 |
| 2005/0008158 | A1 * | 1/2005 | Huh et al. | 380/256 |
| 2005/0018600 | A1 | 1/2005 | Tornar et al. | |
| 2005/0025490 | A1 | 2/2005 | Aoki et al. | |
| 2005/0078965 | A1 | 4/2005 | Kim et al. | |
| 2005/0111495 | A1 | 5/2005 | Gumaste et al. | |
| 2005/0149820 | A1 * | 7/2005 | Gastaldello et al. | 714/758 |
| 2005/0158047 | A1 | 7/2005 | Way et al. | |
| 2005/0185969 | A1 | 8/2005 | Moeller et al. | |
| 2005/0201762 | A1 | 9/2005 | Moeller et al. | |
| 2005/0210353 | A1 * | 9/2005 | Dohmen et al. | 714/746 |
| 2005/0213968 | A1 | 9/2005 | Uda et al. | |
| 2005/0286908 | A1 | 12/2005 | Way | |
| 2006/0051092 | A1 | 3/2006 | Way | |
| 2006/0140643 | A1 | 6/2006 | Way et al. | |
| 2006/0269295 | A1 | 11/2006 | Way | |
| 2006/0275035 | A1 | 12/2006 | Way | |
| 2007/0086332 | A1 | 4/2007 | Way et al. | |
| 2007/0116132 | A1 * | 5/2007 | Fediakine et al. | 375/242 |
| 2007/0201698 | A1 * | 8/2007 | Huh et al. | 380/256 |
| 2008/0013728 | A1 * | 1/2008 | Niu et al. | 380/256 |
| 2008/0044179 | A1 * | 2/2008 | Karpati | 398/20 |
| 2008/0074745 | A1 * | 3/2008 | Javidi et al. | 359/561 |
| 2008/0218864 | A1 * | 9/2008 | Javidi et al. | 359/599 |
| 2008/0222493 | A1 * | 9/2008 | Fediakine et al. | 714/774 |
| 2008/0240711 | A1 * | 10/2008 | Liu et al. | 398/9 |
| 2009/0040304 | A1 * | 2/2009 | Chou | 348/143 |
| 2009/0150754 | A1 * | 6/2009 | Dohmen et al. | 714/785 |
| 2010/0021166 | A1 * | 1/2010 | Way | 398/79 |
| 2010/0091990 | A1 * | 4/2010 | Etemad et al. | 380/256 |
| 2011/0170858 | A1 * | 7/2011 | Aguren | 398/22 |
| 2011/0214160 | A1 * | 9/2011 | Costa et al. | 726/3 |

FOREIGN PATENT DOCUMENTS

| | | |
|---|---|---|
| EP | 0141247 | 5/1985 |
| EP | 0187518 | 7/1986 |
| WO | WO 96-32787 | 10/1996 |
| WO | WO 01-67647 | 9/2001 |
| WO | WO 02-23772 | 3/2002 |
| WO | WO 02-58301 | 7/2002 |
| WO | WO 2004-002024 | 12/2003 |
| WO | WO 2004-064259 | 7/2004 |
| WO | Wo 2006-002080 | 1/2006 |

(56) References Cited

FOREIGN PATENT DOCUMENTS

| | | |
|---|---|---|
| WO | WO 2006-119375 | 11/2006 |
| WO | WO 2007-044939 | 4/2007 |

OTHER PUBLICATIONS

Bannister et al. "How many wavelengths do we really need? A study of the performance limits of packet over wavelengths," APIE Optical Network Magazine, Apr. 2000, pp. 1-12.

Blumenthal et al., "All-optical label swapping with wavelength conversion for WDM-IP networks with subcarrier multiplexed addressing," IEEE Photonics technology letters, vol. 11, No. 11, Nov. 1999, pp. 1497-1499.

Bosco G. et al., "On the use of NRZ, RZ, and CSRZ modulation at 40 Gb-s with narrow DWDM channel spacing," Journal of Lightwave technology, p. 1694-1704, Sep. 2002.

Bosco, G. et al, "Modulation formats suitable for ultrahigh spectral efficient WDM systems," IEEE J. Selected Topics in quantum electron. 10(22): 321-328 (Mar.-Apr. 2004).

Chao et al., "A photonis front-end prcessor in a WDM ATM multicase switch," journal of Lightwave Technology, vol. 18, No. 3, Mar. 2000, pp. 273-285.

Daikoku M. et al., "Performance comparison of modulation formats for 40Gb-s DWDM transmission systems," paper OFN2, Optical Fiber Communications (OFC) Conference, 2005, 3 pages.

Derr et al., "An Optical infrastructure for future telecommunications networks," IEEE Communications Magazine, vol. 33, No. 11, Nov. 1995 pp. 84-88.

Frankel et al. "Optical single-sideband suppressed-carrier modulator for wide-band signal processing," Journal of Lightwave Technology, vol. 16, No. 5, May 5, 1998, pp. 859-863.

Gerstel, O. and R. Ramaswami, "Optical layer survivability: a service perspective," IEEE Communications Magazine, pp. 104-113, Mar. 2000.

Ghani, "lamda-labeling: A framework for IP-over-WDM using MPLS," Optical Networks Magazine, vol. 1, No. 2, Apr. 2000, pp. 45-58.

Gnauck, A.H. and P.J. Winzer, Optical phase shifter keyed transmission, Journal of Lightwave Technology 23 (1): 115-130 Jan. 9, 2005).

Goldstein et al., "Performance implications of component crosstalk in transparent lighwave networks," IEEE Photonics Technology Letters 6(5): 657-660 May 9, 1994).

Heismann,"Polarization mode dispersion: Fundamentals and Impact on Optical Communication System," European conference of Optical Communications (ECOC '98), Sep. 20-24 1998, Madrid, Spain, vol. 2, pp. 51-79 (1998).

Hill, P.M. and Olshansky, R. "Multigigabit subcarrier multiplexed coherent lightwave system," J. Lightwave Technology, vol. 10, No. 11, pp. 1656-1664, Nov. 1992.

Hui et al., "10 Gb-s SCM system using optical single side-band modulation," optical fiber Communication Conference and Exhibit, 2001. OFC 2001, vol. 1, Issue, 2001 pp.: MM4-1-MM4-4.

ITU-T Recommendation G.692, "Optical Interfaces for Multichannel systems with Optical Amplifiers," Oct. 1998, pp. 14-23.

Izutsu et al., "Integrated optical SSB modulation-frequency shifter," IEEE journal of quantum electronics, vol. QE-17, No. 11, Nov. 1981, pp. 2225-2227.

Jiang et al., Multi-Lane PMD reliability and Partial fault protection (PFP), IEEE 802.3ba, Jan. 2008, 25 pages, http:--www.ieee802.org-ba-public-jan08-jiang_01_0108.pdf, accessed on Apr. 8, 2008.

Johansson, B.S. et al. "Flexible bus: a self-restoring optical ADM ring architecture," Electronic Letters, vol. 32, No. 25, pp. 2338-2339, Dec. 1996.

Joo, Y. et al., "1-fiber WDM self-healing ring with bidirectional optical add-drop multiplexers," IEEE Photon. Technol. Lett. 16(2): 683-685 (Feb. 2004).

Kaminow, I. and t. Li, (Eds.), "Optical Fiver telecommunications IVB; systems and Impairments," San Diego: Academic press, Chapter 16, pp. 868-876 (2002).

Kinoshita et al., "Metro WDM network with photonic domains," Optical Fiber Communication Conference OFC 2004, vol. 1, Feb. 23-27, 2004, 3 pages.

Kitayama, "Highly spectrum efficient OFDM-PDM wireless networks by using iptical SSB modulation," journal of Lightwave Technology, vol. 16, No. 6, Jun. 1998, pp. 969-976.

Lee et al., "A wavelength-convertible optical network," Journal of Lightwave Technology, Nol. 11, May.Jun. 1993, p. 962.

Lyubomirsky, L. and C. Chien, "Tailoring the duobinary pulse shape for optimum performance," J. Lightwave Technology 23911): 3732-3736 (Nov. 2005).

Masetti, et al., "High speed, high capacity STM optical switches for future telecommunication transport networks," IEE journal on Selected Areas in Communications, vol. 14, No. 5, Jun. 1996, pp. 979-998.

Ohn et al., "Dispersion variable fibre Bragg grating using a piezoelectric stack," Electronic Letters, vol. 32, No. 21, Oct. 10, 1996, pp. 2000-2001.

Okamoto et al., "Optical path Cross-connect systems for photonic networks," Global telecommunications Conference, Nov. 1993, vol. 1, pp. 474-480.

Ono, T. et al., Characteristics of optical duobinary signals in terabit-s capacity, high spectral efficiency WDM systems, J. Lightwave technology 16(5): 778-797, May 1998.

Ramamurthy, Byrav, et al. "Wavelength Conversion in WDM networking," IEEE journal on Selected Areas in Communication, vol. 16, Sep. 1998, pp. 1061-1073.

Ramos, et al., "Comparison of optical single-sideband modulation and chirped fiber gratings as dispersion mitigating techniques in optical millimeter-wave multichannel systems," IEEE Photonics technology Letters, vol. 11, No. 11, Nov. 1999, pp. 1479-1481.

Sano et al., "30 ×100 gbs-all-optical OFDM transmission over 1300 km SMF with 10 ROADM nodes," Technical Digest of ECOC 2007, paper PDS1.7 (2007), 2 pages.

Sargis, P.D. et al., "10-Gb-s subcarrier multiplexed transmission over 490 km of ordinary single-mode fiver without dispersion compensation," IEE Photon. Tech. Lett. 9(12):: 1658-1160 (Dec. 1997).

Shankar, "Duobinary modulation for optical systems," Dec. 5, 2002, retrieved from internet http:--www.inphi-corpi.com-products-whitepapers-Duobinary-ModulationForOpticalSystems.pdf on Oct. 14, 2005, 10 pages.

Shi et al., "High-speed electrooptic modulator characterization using optical spectrum analysis," J. Lightwave Technol. 21(10): 2358-2367, (Oct. 2003).

Shtaif, M. and A.H.Gnauck, The relation between optical duobinary modulation and spectral efficiency in WDM systems, IEEE Photon. Techno. Lett. 11(6):712-714 (Jun. 1999).

Sieben et al., "Optical single sideband transmissiona t 10Gb-s using only electrical dispersion compensation," Journal of Lighwave Technology, vol. 17, No. 10, Oct. 1999, pp. 1742-1748.

Smith et al., "Broad-band millimeter-wave (38 Ghz) Fiber-wireless transmission system using electrial and optical SSB modulation to overcome dispersion effects," IEEE Photonics Techonolgy Letters, vol. 10, No. 1, Jan. 1998, pp. 141-143.

Smith et al., "OVercoming chromatic-dispersion effects in fiber-wireless systems incorporating external modulators," IEEE transactions on Microwave theory and techniques 45(8): 1419-1415 (Aug. 1997).

Spring et al., "Photonic header replacement for packer switching," Electronic Letters, vol. 29, No. 17, Aug. 19, 1993, pp. 1523-1525.

Sun et al., "Tunable compensation of dispersion-induced RF power degradation in multiple-channel SCM transmission by nonlinearly-chirped FBG's," CLEO '99, 1999, pp. 316-317.

Van den Borne, D. et al., "Coherent equalization versus direct detection for 111-Gb-s ethernet transport," IEEE LEOS Summer tropical Meetings, pp. 12-13, Jul. 23-25, 2007.

Van Deventer et al., "Power penalties due to Brillouin and Rayleigh scattering in a bi-directional coherent transmission system," IEE Photon. Lett. 6(2): 291-294 (Feb. 1994).

Walkin, "Multilevel signaling for increasing the reach of 10 Gb-s lightwave systems," Journal of Lightwave Technology, vol. 17, No. 11, Nov. 1999, pp. 2235-2248.

(56) References Cited

OTHER PUBLICATIONS

Way, "Broadband hybrid fiber coax access system technologies," New York Academic Press, 1998, pp. 253-300.

Way, "Spectral efficient parallel PHY for 100 GbE Man and Wan," IEEE Applications and Practice (distributed with IEEE Communications magazine), pp. 20-23, (Dec. 2007).

Way, "Subcarrier multiplexed lightwave system design considerations for subcarrier loop applications," Journal of Lightwave Technology, vol. 7, No. 11, Nov. 1989, pp. 1806-1818.

Weng, c. and W.I. Way,"A single-fiber optical unidirectional-path switched-ring network using double-sideband-supressed carrier modulation technique," Photonics Technology Letters, IEEE 18(21): 2236-2238 (Nov. 2006).

Winzer, P. and G. Raybon, "100G Ethernet—a review of serial transport options," IEEE LEOS Summer Tropical Meetings, Jul. 23-25, 2007, pp. 708.

Wree, C. et al., Coherent receivers for phase-shift keyed transmission, OFC-NFOEC, paper OMP6, 2007, 3 pages.

Wu et al., CSO distortions due to the combined effects of self- and external-phase modulations in Long-distance 1550nm AM-CATV systems, IEEE Photonics technology Letters, vol. 11, No. 6, Jun. 1999, pp. 718-720.

Xie, C. et al., "Improvement of optical NRZ- and RZ-duobinary transmission systems with narrow bandwidth optical filters," IEEE Photon. Tech. Lett. 16(9): 2162-2164 (Sep. 2004).

Yonenaga, et al., "Dispersion-tolerant optical transmission system using duobinary transmitter and binary receiver," Jouranl of Lightwave Technology, vol. 15, No. 8, Aug. 1997, pp. 1530-1537.

* cited by examiner

100a

100b

200

300

400

500

600

700

800

SUBCHANNEL SECURITY AT THE OPTICAL LAYER

CROSS REFERENCE TO RELATED APPLICATIONS

This application claims the benefit, pursuant to 35 U.S.C. §119(e), of U.S. Provisional Patent Application No. 61/306,925, filed Feb. 22, 2010, entitled "Subchannel Security at the Optical Layer," which is hereby incorporated by reference in its entirety.

I. BACKGROUND

A. Field of Art

This application relates generally to optical communications based on optical wavelength-division multiplexing (WDM), and in particular to systems and techniques for security at the optical (physical) layer of the Open Systems Interconnection (OSI) Seven Layer Model.

B. Description of Related Art

Optical WDM communication systems transmit multiple optical channels at different WDM carrier wavelengths through a single fiber. The infrastructures of many deployed optical fiber networks today are based on 10 Gb/s per channel. As the demand for higher transmission speeds increases, there is a need for optical networks at 40 Gb/s, 100 Gb/s or higher speeds per channel.

WDM networks transmit client traffic from multiple sources over an optical fiber network. The traffic is multiplexed on the fiber by transmitting each signal with a laser set at a different channel on the International Telecommunication Union (ITU) channel plan defined in Standard G.692. Optical filters designed to function according to the ITU channel plan are used to demultiplex the signals and thereby direct each signal to its designated receiver. These standard ITU channels are hereinafter referred to simply as "channels."

Various forms of subchannel modulation have been proposed as a means to reduce the dispersion penalties associated with high bit rate transmission in optical fibers (see, eg, WO 2009/105281) and increase spectral efficiency (see, eg, U.S. Pat. No. 6,525,857). These "subchannels" (eg, subchannels of ITU channels) are typically generated by microwave modulators or comb generators with a single laser. Examples of optical comb generators are described in U.S. patent application Ser. No. 12/175,439, entitled "Optical Wavelength-Division Multiplexed (WDM) Comb Generator Using a Single Laser" and filed on Jul. 17, 2008, which is incorporated by reference herein. These subchannels are closely spaced relative to the source laser and are not independently tunable across a wide wavelength range, i.e. they are tuned in parallel as the source laser is tuned. Although an embodiment of one of the previously referenced patent applications (WO 2009/105281) proposes the use of more than one laser to generate the subchannels, such lasers are constrained to operate in parallel within a single ITU G.692 window.

Lower-rate subcarriers support a simplified upgrade of an installed DWDM network. For example, a legacy 2.5 Gb/s network may have transmitters with a reach of 600 km. When that network is upgraded to 10 Gb/s, dispersion compensators may have to be installed, since the reach of the 10 Gb/s transmitter may be only 80 km. Installing dispersion compensation and amplifiers to compensate for their loss can be very disruptive since operators may have to break the traffic multiple times and at multiple sites. If four subcarriers are used instead, with each subcarrier transmitting at 2.5 Gb/s to get 10 Gb/s composite bandwidth, they can have comparable dispersion-limited reach to the installed 2.5 Gb/s channels. The use of subcarriers therefore provides system operators with a means of upgrading an installed WDM network to increase the network capacity without having to change the dispersion map.

An improved implementation of subchannels (eg, using independently tunable lasers to generate independent subcarrier frequencies) is described in U.S. patent application Ser. No. 12/961,432, filed Dec. 6, 2010, entitled "Subchannel Photonic Routing, Switching and Protection with Simplified Upgrades of WDM Optical Networks," which is hereby incorporated by reference in its entirety. This implementation not only increases bandwidth and spectral efficiency by enabling multiple client circuits to be assigned to respective subchannels of a single ITU channel, but also allows those client circuits to be divided and/or combined with one another and assigned independently to subchannels within and across ITU channels. Such flexibility enables various routing, switching, concatenation and protection capabilities that allow system designers to fully realize the benefit of increasing the number of available optical circuits in a single fiber.

FIG. 1A shows an embodiment of a currently deployed WDM subchannel muxponder 100*a* in which client traffic (eg, 1 to N discrete client signals) is mapped onto corresponding subchannels. Client traffic is connected via a short-reach fiber interface to client interface transceivers 110*a*. These are typically pluggable devices such as an XFP [a MSA standard], shown in client transceivers 110*b* in FIG. 1B, which may support one or more different client protocols (eg, Ethernet, SONET, Fibre Channel, etc). As will be discussed below in the context of the present invention, other standards (eg, SFP, CFP, etc) may also be employed separately or in combination.

After each optical signal is converted to an equivalent electrical signal, it can be processed digitally by FEC-SERDES block 120*a* to optionally (1) extract performance monitoring information, (2) add channel overhead for remote network management, and (3) encode the data for forward error correction.

In this embodiment, subcarrier multiplexing is employed (as described in U.S. Pat. No 6,525,857) to generate a group of subcarriers using a single laser (eg, via transceiver 140*a*) with a common wavelocker (λ-locker) 130*a* to maintain the stability of the subcarrier frequencies (subchannels). Subcarrier multiplexing would, of course, be unnecessary if only one client signal was supported per ITU channel. In other embodiments (as described in U.S. patent application Ser. No. 12/961,432), each subchannel can have its own independently tuned and modulated laser, and each subcarrier can carry independent protocols. Moreover, there are no restrictions at the transmit side on the frequency spacing between subchannels, and each subchannel can be transmitted in a different ITU channel, and received via a corresponding independently tuned filter on the receive side.

In this embodiment, optical modulators/demodulators 135*a* modulate the laser generated via transceiver 140*a* (at each subcarrier frequency/wavelength within a single ITU channel) to produce modulated laser beams that carry the information from the respective lower speed electronic signals 122*a*. As will be discussed below in the context of the present invention, modulation of each subchannel can be selectively chosen to be one of many different types of modulation, such as Optical DuoBinary, Non-return to Zero, Differential Quadrature Phase Shift Keying, etc. Moreover, in the event that multiple subcarriers (ie, subchannels) are employed, different modulation schemes may be utilized across subchannels.

In this embodiment, the modulated signals generated by transceiver 140*a* consists of 1 to N subchannels that are combined by multiplexer 150*a* and then transmitted onto the transmission fiber. The transmitted light signal can be combined with light signals from other WDM transponders/muxponders (containing client signals carried on additional ITU channels) onto a single transmission fiber via an optical multiplexer (not shown). In other embodiments, one or more lasers may be employed to generate virtually any number of subchannels (within or across ITU channels).

On the receive side, the optical signal is received from the transmission fiber, filtered into individual ITU channels (filters also not shown), with each ITU channel being demultiplexed (eg, via demultiplexer 160*a*) into separate subchannels that are then converted back into equivalent electrical signals 122*a* by the receive circuitry in transceiver 140*a*. Note that external means may be required to select the particular wavelength that is being dropped, though this filter function can be integrated onto the same line card (see, eg, U.S. Pat. No. 6,525,857). The electrical signal from the line receiver can be processed digitally by FEC-SERDES block 120*a* to optionally (1) extract performance monitoring information, (2) drop the channel overhead for remote network management, and (3) correct errors according to the Forward Error Correction (FEC) algorithm. The client signals are then returned to the client equipment via their respective client-side transceivers 110*a*.

A slightly more detailed embodiment of the muxponder described in FIG. 1A is illustrated in FIG. 1B. In this embodiment, four XFP transceivers 110*b* are employed to interface with four discrete client signals which, as also noted above, could each carry a different client protocol (such as Ethernet, SONET, Fibre Channel, etc). Transceivers 110*b* communicate with four corresponding encoders/decoders in FEC-SERDES block 120*b*. In other embodiments, FEC-SERDES block 120*b* could share a fewer number of encoders/decoders (depending upon the application and the various protocols employed). These four encoded client signals 122*b* are transmitted to/from transceiver 140*b* (in this embodiment, combined with modulation/demodulation circuitry, shown separately as block 135*a* in FIG. 1A). Transceiver 140*b* generates four subcarrier signals (subchannels), utilizing common wavelocker 130*b*, which are combined by multiplexer 150*b* (and demultiplexed on the receive side via demultiplexer 160*b*) to interface with the line side of the transmission fiber.

As will be discussed below in the context of the present invention, the basic muxponder illustrated in FIGS. 1A and 1B can include various embodiments employing differing combinations of client signal protocols, client transceiver interface standards, modulation schemes, and optional subcarrier multiplexing with one or more fixed or independently tuned lasers (as well as fixed or tunable filters) to implement virtually any number of subchannels.

Regardless of which embodiment is employed, however, the client traffic remains potentially vulnerable to attack. For example, sophisticated eavesdroppers may tap the fiber, extract the information from a particular ITU channel (or subchannel) and attempt to decrypt the associated client signal (or portion thereof, if the client signal is divided among subchannels across multiple ITU channels).

Most existing security schemes for protecting client traffic in WDM networks involve encryption of data at the data link layer. Significantly enhanced security can be attained, however, by also securing the physical transmission of client traffic at the optical layer.

II. SUMMARY

Various embodiments of the current invention are disclosed herein, including techniques, apparatus, and systems for optical WDM communications that involve dynamically modifying certain aspects of the WDM transmission (and corresponding receive) process at the optical (physical) layer to significantly enhance data/network security. Moreover, these various dynamic modifications can be employed individually or in combination to provide even greater security depending upon the desired application and design tradeoffs.

WDM transmission involves processing client signals (each received at a particular line rate of transmission) to prepare them for transmission on a fiber optic cable of an optical network. As will be discussed below, these processing steps typically include encoding the client signals, mapping them to one or more subchannels within or across ITU channels, modulating them onto subcarrier frequencies, and multiplexing them together for optical transmission. By dynamically modifying one or more of these processing steps over time (in addition to any encryption of the underlying client signals), the current invention provides additional security at the physical (optical) layer of an optical network and thus greatly enhances overall network security.

For example, alternating scrambling/descrambling (encoding/decoding) schemes are employed, such as periodically alternating between G.709 and G.795 scramblers/descramblers. Client signal switching can also be employed dynamically to remap individual client signals to different subchannels within an ITU window. This is accomplished in one embodiment (following the scrambling/descrambling process) by buffering, switching, and resynchronizing the client signals before modulating them onto different subcarrier frequencies (subchannels).

The line rates of the client signals can also be altered dynamically (in one embodiment, after the dynamic switching has occurred) to mask the differences among the line rates of various standard protocols, such as Ethernet, SONET and Fibre Channel. These line rates can be normalized (eg, to the same line rate), or simply modified (increased or decreased) to impede detection of the protocol employed.

The particular ITU channel to which the subchannels are assigned can also be modified dynamically. In one embodiment, a laser is retuned dynamically to a different ITU channel window before modulating the client signals onto multiple subcarrier frequencies (subchannels). In other embodiments, separately tuned lasers can be employed, and client signals can even be moved independently of one another to any available subchannel within different ITU windows. In either case, one or more subchannel frequencies (carrying their corresponding client signals) are moved (dynamically, at various times) to a different ITU channel window, making isolation of a particular client signal over time quite difficult.

Moreover, the "lambda drift" of the subcarriers within a single ITU window can be altered dynamically, effectively shifting the subchannels together to occupy a slightly different portion of the ITU channel window. Even a shift of a few GHz could significantly impede an eavesdropper from isolating the client signal carried on a particular subchannel over time, not to mention the added complexity of tracking the signal's independent "movement" among those subchannels (or even to a different ITU channel) at different times.

The polarization of the subcarrier frequencies within an ITU channel can also be altered dynamically. For example, if four subchannels are employed, subchannels 1 and 3 might be polarized orthogonally to subchannels 2 and 4, with subchannels 1 and 3 oriented in a first direction, and subchannels 2 and 4 oriented in a second direction orthogonal to the first direction. Swapping the orientation of these subchannels dynamically will have a similar effect to remapping the client signals to different subcarrier frequencies. Polarization is, in essence, another dimension (orientation, as opposed to frequency) which, when changed, adds another variable to impede an eavesdropper's ability to isolate a particular client signal over time.

Finally, as alluded to above, different modulation schemes can be employed dynamically to one or more of the subchannels. Moreover, the modulation schemes can each be altered dynamically at different times in accordance with a different algorithm.

As noted above, these dynamic modifications can be employed individually or in combination to exponentially enhance the level of security by making it virtually impossible to isolate a particular client signal over time. An optical service channel (OSC) can be employed to communicate among the nodes of an optical network which of the various schemes is being employed, including the algorithms for making such modifications over time. Each node can therefore perform the appropriate modification (eg, remapping a client signal to a different subcarrier frequency) on the transmit side and, conversely, detect the modification (eg, receiving the client signal on the remapped subchannel) on the receive side.

Such modifications can be implemented under software control, or via dedicated hardware, and can be performed centrally (e.g., via a standard client-server EMS, or element management system, such as EMS 1140 illustrated in FIG. 11 of U.S. patent application Ser. No. 12/961,432) or in a distributed fashion at the devices that implement the various aspects of the WDM transmission process (scrambling, buffering, channel/subchannel assignment, polarization, modulation, laser frequency control, etc.).

III. BRIEF DESCRIPTION OF THE DRAWINGS

IV. DETAILED DESCRIPTION OF THE CURRENT INVENTION

A. Alternating Scrambling/Descrambling Schemes

Figure 1A:
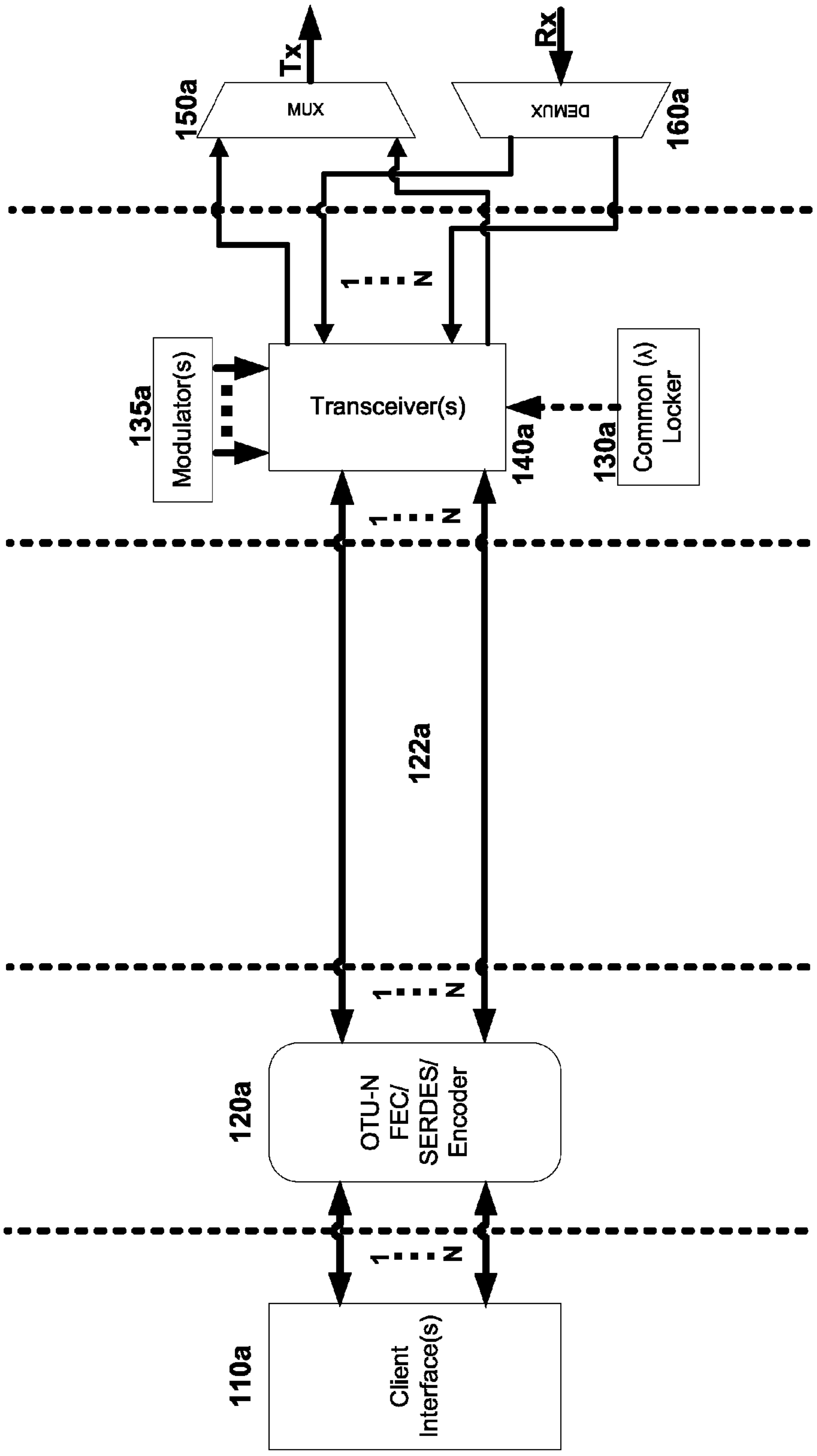
FIG. 1A is a block diagram of a subchannel muxponder that employs a single laser to implement subcarrier multiplexing among 1 to N subchannels within an ITU window.
Figure 1B:
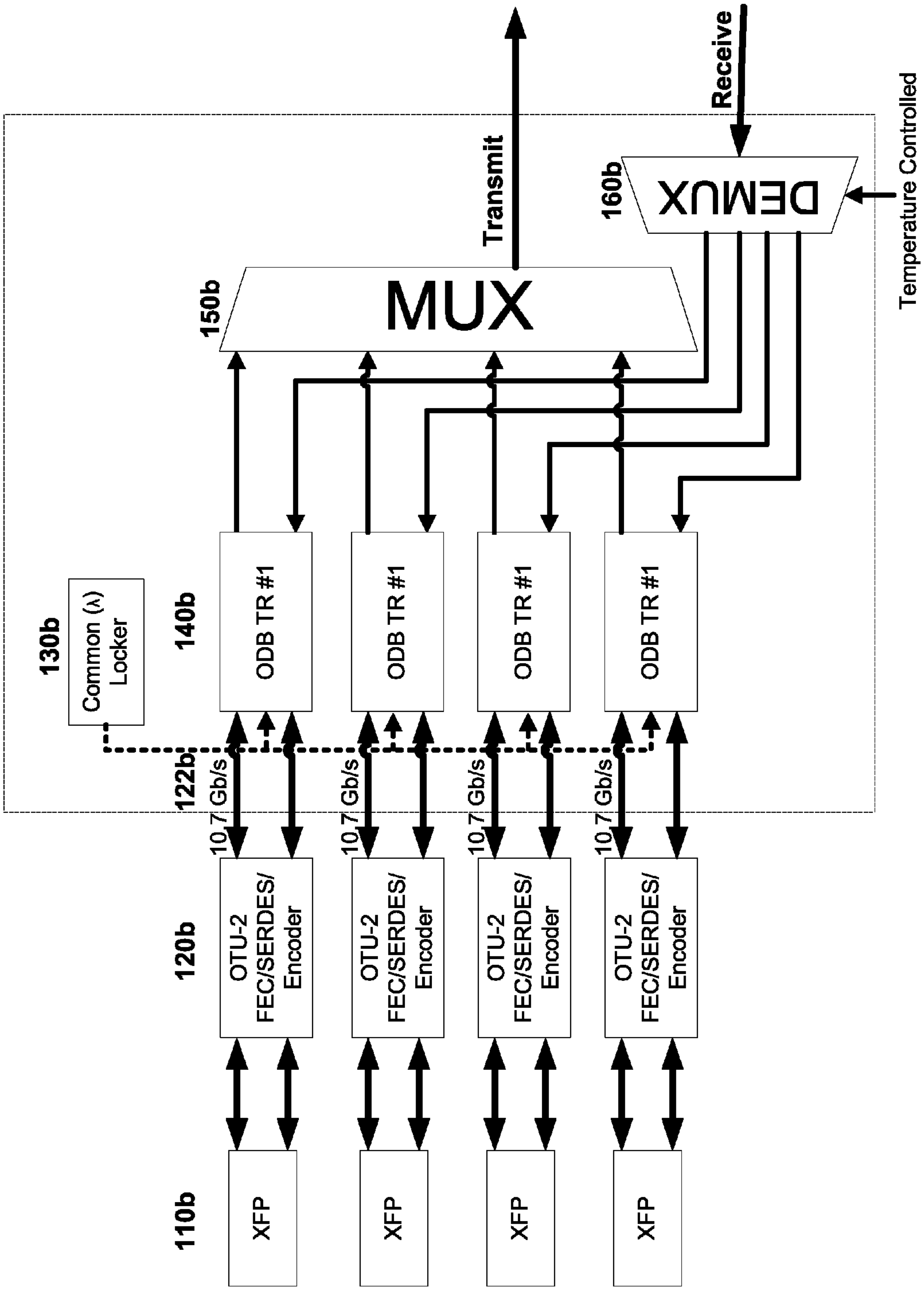
FIG. 1B is a block diagram of a slightly more detailed embodiment of the subchannel muxponder shown in FIG. 1A, which employs a client-side interface to four client signals via four corresponding XFP client transceivers, and the use of optical duo-binary (ODB) modulation to modulate the client signals into four subchannels.
Figure 2:
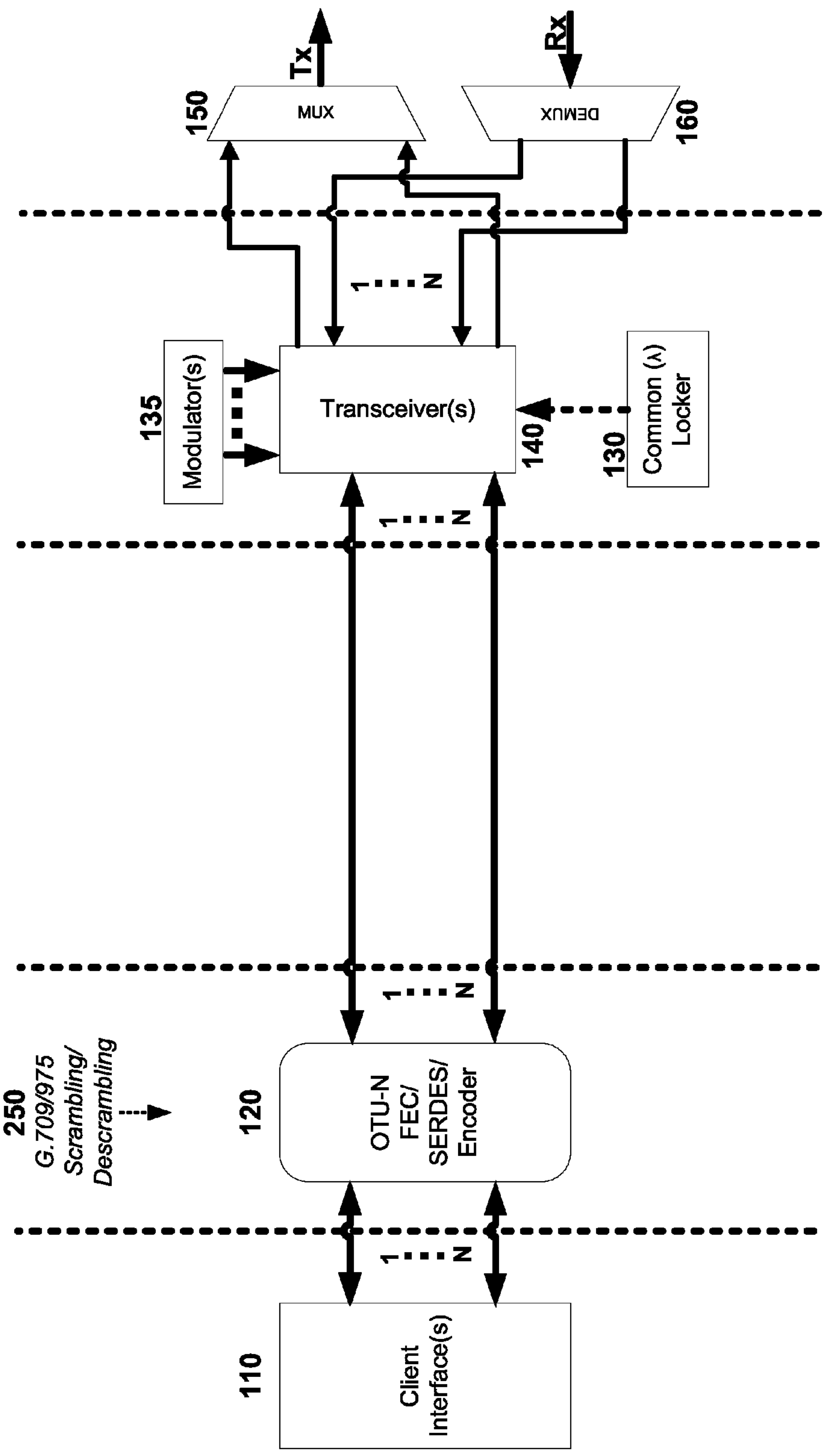
FIG. 2 is a block diagram of an embodiment of the subchannel muxponder in which alternating scrambling/descrambling schemes (G.709 and G.795) are employed dynamically.

Turning to FIG. 2, subchannel muxponder 200 represents a modified embodiment of subchannel muxponder 100*a* of FIG. 1A, with the addition of G.709/975 Scrambler/Descrambler 250. As noted above, each client signal may be transmitted via any of various standard data protocols, such as Ethernet, SONET, Fibre Channel, etc. The digital processing of such client signals by FEC-SERDES block 120*a* of FIG. 1A involves a process of encoding each client signal into a standard frame structure for the transport of services over optical wavelengths in WDM systems. Different standard implementations of such frame structures include the G.709 and G.975 recommendations of the International Telecommunications Union (ITU-T).

In the embodiment illustrated in FIG. 2, G.709/975 Scrambler/Descrambler 250 causes the digital processing of client signals to alternate over time between using the G.709 standard and the G.975 standard. For example, in one embodiment, the G.709 standard is employed for a predetermined period of time whenever a network node initiates one or more client signals onto the optical network. When such time period expires, the G.975 standard is then used for a predetermined period of time. The two predetermined periods of time may or may not be equivalent. Moreover, a network node may alternate between the two standards based upon a condition other than the expiration of a predetermined time period, such as the detection of a potential intruder (eg, by monitoring the overall power level of the transmission fiber for a loss of power indicating a possible fiber cut or a tap of the fiber by an eavesdropper).

Should an eavesdropper be monitoring the fiber, the change from one framing standard to another (at times unknown to the eavesdropper) will make it difficult for the eavesdropper to detect and isolate a particular client signal over time. A receiving node, however, would receive information from the sending node (eg, via the OSC channel) identifying the algorithm for alternating among the standards, and thus would know which standard to use when attempting to decode the received client signal.

B. Remapping Client Signals Among Subchannels

Figure 3:
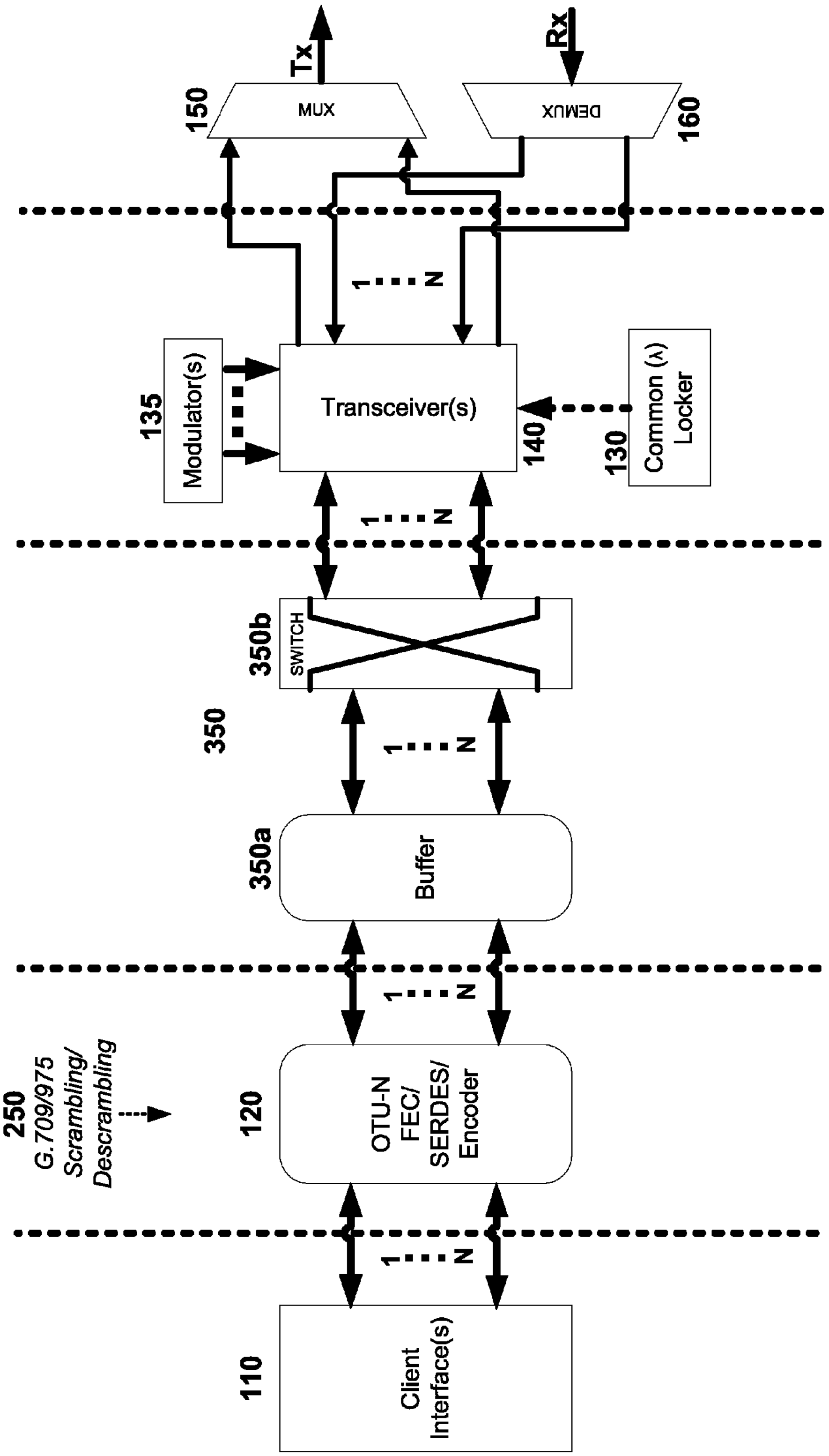
FIG. 3 is a block diagram of an embodiment of the subchannel muxponder containing a buffer and switch to dynamically remap the client signals to different subchannels over time.

In addition to periodically (or otherwise) alternating between standard framing structures, network nodes can dynamically remap individual client signals to different subchannels within an ITU window, as illustrated in FIG. 3. In one embodiment, following the scrambling/descrambling process, the encoded client signals from FEC-SERDES block 120 are buffered, switched and resynchronized, via Subchannel Switch 350 containing Buffer 350*a* and Switch 350*b*, before being modulated onto different subcarrier frequencies (subchannels).

Subchannel Switch 350 enables any permutation of the mapping of client signals to subchannels to be implemented dynamically over time, whether periodically or in accordance with a condition (such as the detection of a potential intruder). Moreover, the switching methodology (ie, which client signal is mapped to which subchannel) can be random, cyclical or in accordance with virtually any desired algorithm.

C. Protocol Line Rate Modification

Figure 4:
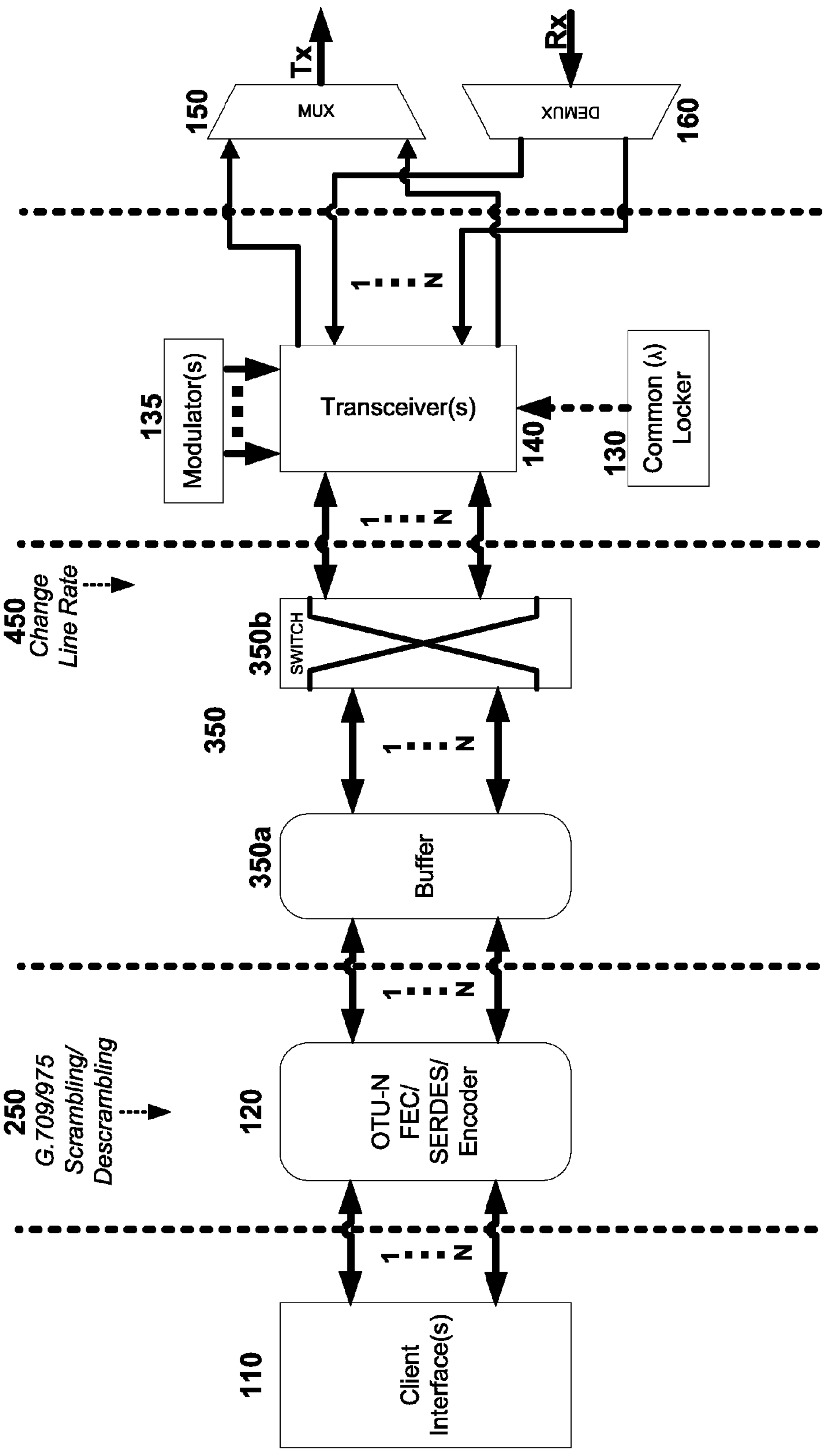
FIG. 4 is a block diagram of an embodiment of the subchannel muxponder in which line rates of the client signals are altered dynamically to mask the differences among the line rates of various standard protocols.

Turning to FIG. 4, another dynamic modification to the transmission process involves modifying the line rate of one or more client signals, as illustrated by line rate modifier 450 which, in one embodiment, relies upon Buffer 350*a* (regardless of whether Switch 350*b* is employed to remap client signals dynamically to different subchannels). Because various standard protocols (eg, Ethernet, SONET and Fibre Channel) have slightly different line rates, this fact could make it easier for an eavesdropper to detect a particular client signal (eg, if the protocol were known). To mask these differences, a network node can periodically (or otherwise) modify the line rate of one or more client signals. Each individual line rate can be decreased or increased (eg, by buffering and/or padding frames of data), and, in one embodiment, client signals can all be normalized to the same line rate.

Regardless of the particular implementation of line rate modifier 450 (eg, the algorithms for determining which line rates to change, how they are changed and whether they are changed periodically or conditionally), the line rate of one or more client signals is modified over time before being modulated onto one or more subchannels. Here too, the change in line rates can occur separately or in combination with the other dynamic modifications discussed herein.

D. Moving Subchannels to Different ITU Windows

Figure 5:
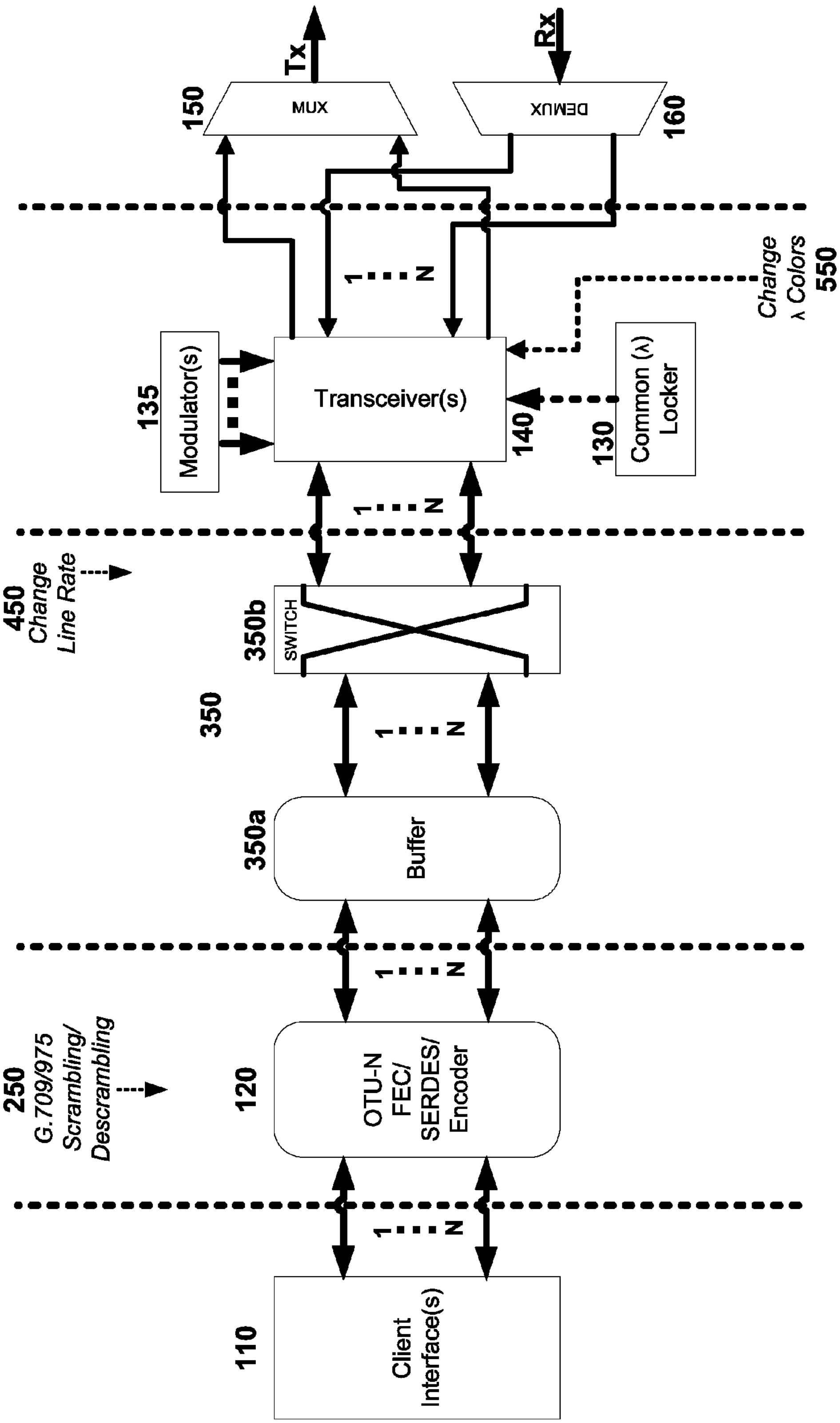
FIG. 5 is a block diagram of an embodiment of the subchannel muxponder in which the ITU channel window containing the subcarrier frequencies (subchannels) is modified dynamically over time.

Turning to FIG. 5, wavelength modifier 550 can be employed to modify dynamically the particular ITU channel window to which the subcarrier frequencies (subchannels) are assigned. In one embodiment, a laser is retuned dynamically to a different ITU channel window before modulating the client signals onto multiple subcarrier frequencies (subchannels). As a result, whenever the ITU channel is changed, the client signals carried on the subcarrier frequencies are moved together as a group to a different ITU channel, making a potential eavesdropper's isolation of a particular client signal over time more difficult.

In other embodiments, separately tuned lasers can be employed for each subcarrier frequency (subchannel), whether within or across ITU channels. When combined with the remapping of client signals illustrated in FIG. 3, a client signal can "move" over time not only to a different subchannel within an ITU channel, but also to an entirely different ITU channel. Moreover, the dynamic algorithms determining the timing or conditions under which a client signal is remapped to a different subchannel within an ITU channel window, as compared to "moving" all of the subchannels from one ITU channel window to another, can be independent of each other.

E. Altering Subcarrier Frequency Lambda Drift

Figure 6:
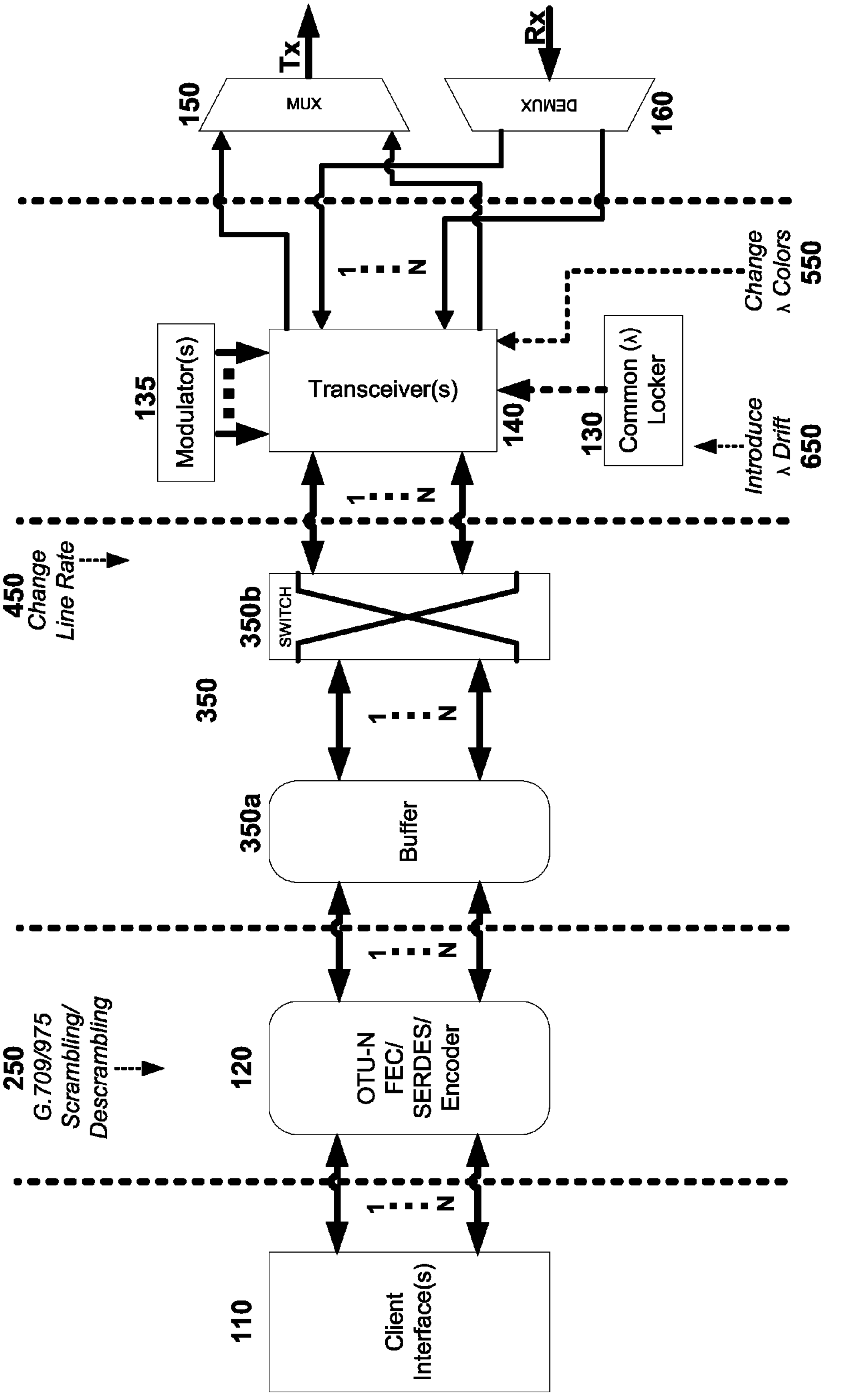
FIG. 6 is a block diagram of an embodiment of the subchannel muxponder in which the lambda drift of the subcarrier frequencies within an ITU channel is altered dynamically over time.

Turning to FIG. 6, lambda drift modifier 650 can be employed (in addition to the other dynamic modifications discussed herein) to introduce a shift in the subcarrier frequencies within an ITU window over time. For example, although the relative spacing of the subcarrier frequencies would remain constant, these subcarrier frequencies would shift (eg, a few GHz) within the range afforded by the particular ITU channel window. Even this slight change, particularly if modified in accordance with a pseudo-random or other algorithm over time, would be virtually impossible to detect, as the number of permutations would quickly grow exponentially.

F. Modifying Subcarrier Frequency Polarization

Figure 7:
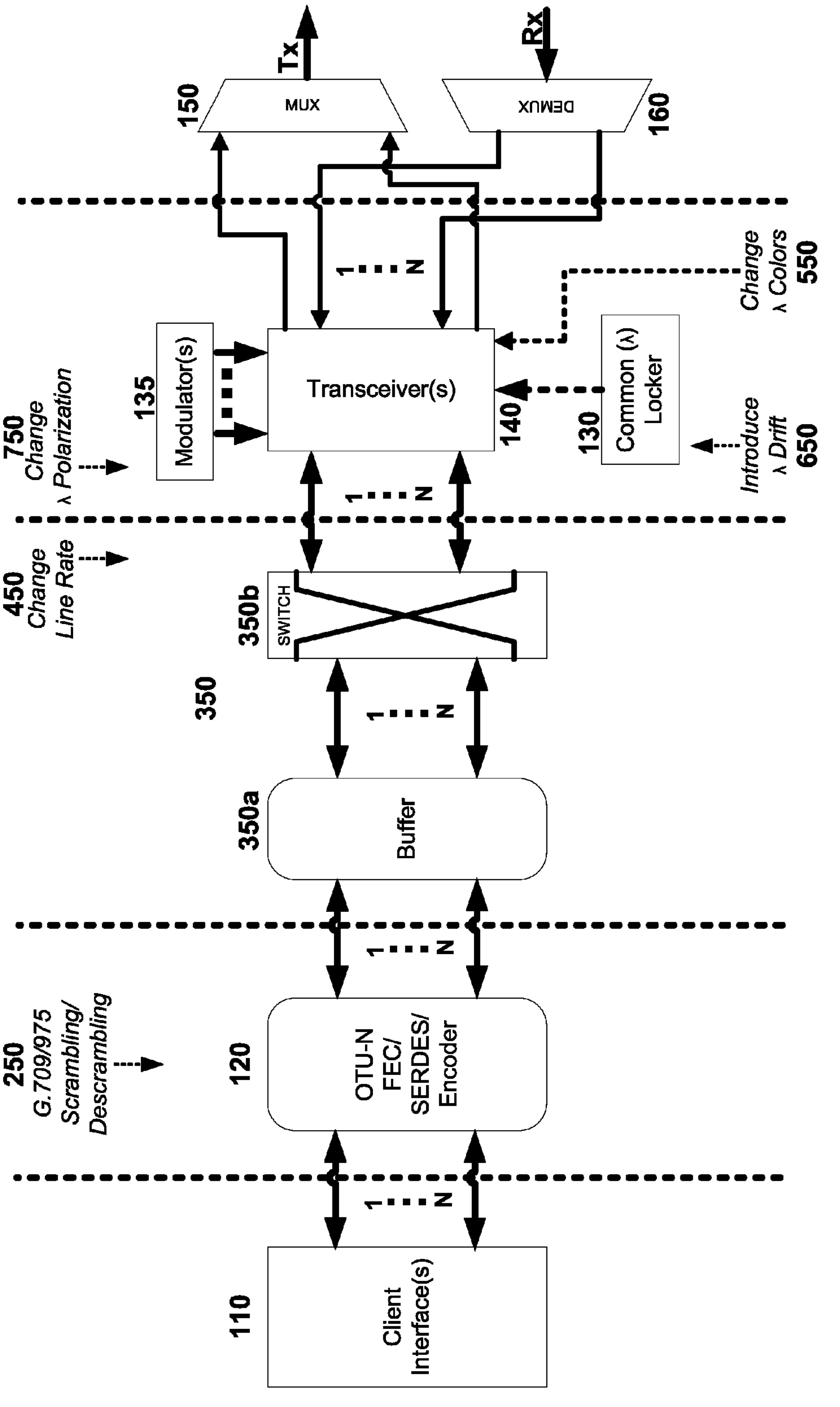
FIG. 7 is a block diagram of an embodiment of the subchannel muxponder in which the polarization of subcarrier frequencies is modified dynamically over time.

As illustrated in FIG. 7, polarization modifier 750 can be employed to alter the polarization of the subcarrier frequencies within an ITU channel dynamically. For example, if four subcarriers (subchannels) are generated by transceiver 140, yielding only two different polarization states (eg, subchannels 1 and 3 in one state with subchannels 2 and 4 in an orthogonal state), the number of permutations resulting from a relatively frequent periodic (or other change) in these states would nevertheless quickly increase exponentially. Moreover, when combined with the different dynamic modifications to the WDM transmission process discussed above, the strength of the overall network security is significantly enhanced.

G. Modifying Subcarrier Modulation Schemes

Figure 8:
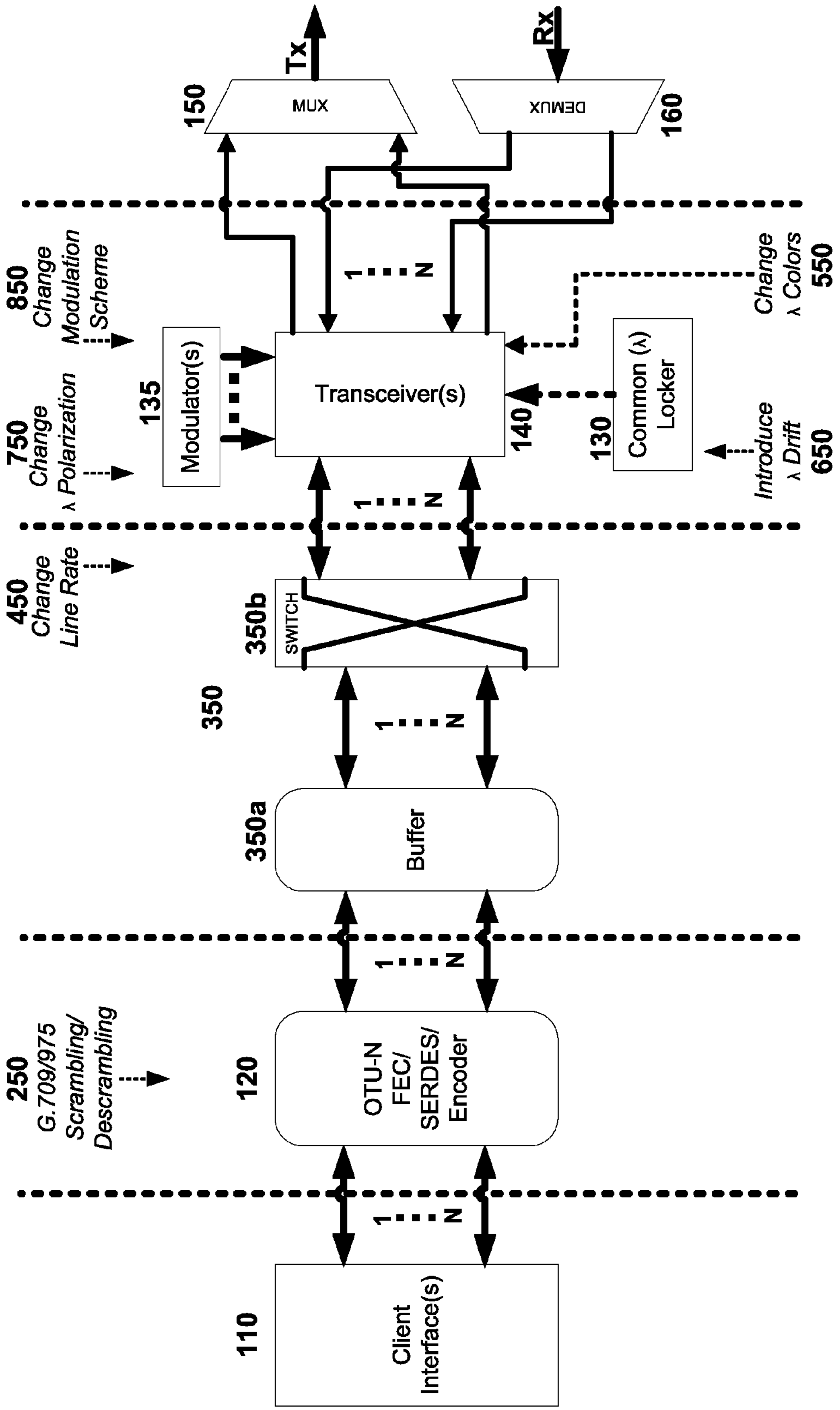
FIG. 8 is a block diagram of an embodiment of the subchannel muxponder in which the modulation scheme(s) employed to modulate the encoded client signals onto different subcarrier frequencies (subchannels) are modified dynamically over time.

Finally, as illustrated in FIG. 8, modulation modifier 850 can be employed to dynamically alter the modulation scheme(s) implemented by modulators/demodulators 135. In other words, not only can each subchannel be generated using a different modulation scheme (eg, Optical DuoBinary, Non-return to Zero, Differential Quadrature Phase Shift Keying, etc), but the modulation scheme used to generate each subchannel may be changed periodically (or in accordance with virtually any algorithm) over time. In one embodiment, the algorithms that determine when to change modulation schemes differ per subchannel and are independent of one another. In other embodiments, these algorithms may be shared among one or more subchannels.

H. Dynamic Modification Process

Figure 9:
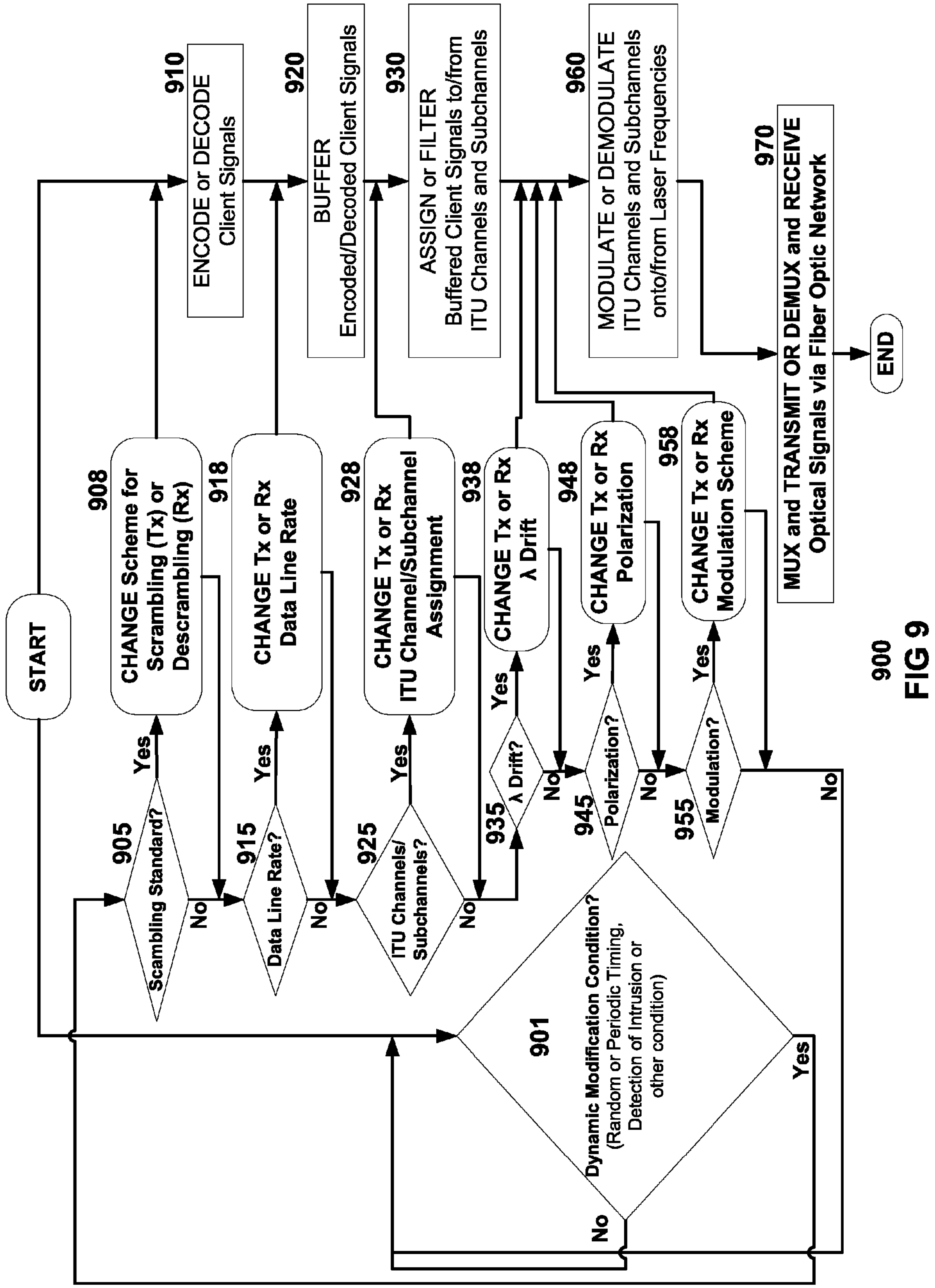
FIG. 9 is a flowchart illustrating one embodiment of the present invention in which one or more aspects of the WDM transmission and receive processes, discussed with respect to FIGS. 2-8 above, are modified dynamically to provide security at the physical layer of an optical network.

Flowchart 900 in FIG. 9 illustrates one embodiment of the present invention in which one or more aspects of the WDM transmission and receive processes, discussed with respect to FIGS. 2-8 above, are modified dynamically to provide security at the physical layer of an optical network. Disregarding for a moment the dynamic modifications employed in the context of the present invention, each node performs the transmit and receive functions discussed above, including encoding or decoding client signals in step 910, buffering and synchronizing these signals at their various data rates in step 920, assigning these signals to (or filtering them from) ITU channels and subchannels (e.g., via switch 350*b* in FIGS. 3-8) in step 930, modulating ITU channels and subchannels onto (or demodulating them from) laser frequencies in step 960, and, finally, multiplexing and transmitting optical signals onto (or demultiplexing and receiving them from) fiber optic cables of an optical network in step 970.

In one embodiment, while these transmit and receive steps are occuring, the system is also determining continuously, in step 901, whether any conditions have been met that will result in the dynamic modification of one or more of these transmit and receive steps. As noted above, these dynamic modifications can be employed individually or in combination to exponentially enhance the desired level of security. They can be implemented under software control, or via dedicated hardware, and can be performed centrally or in a distributed fashion. Each node can therefore perform the appropriate modification (eg, remapping a client signal to a different subcarrier frequency) on the transmit side and, conversely, detect the modification (eg, receiving the client signal on the remapped subchannel) on the receive side.

In one embodiment, step 901 is performed (including the algorithms that determine whether the conditions triggering such modifications have been met) via software running on an EMS, the results of which are communicated to individual nodes via an OSC channel on the optical network. Step 901 is repeated until such time as a dynamic modification condition is met.

Once a dynamic modification condition is met, processing proceeds to step 905 to determine whether the condition relates to the encoding or decoding of client signals, such as alternating periodically between standard scrambling/descrambling schemes (e.g., the G.709 and G.975 standards). If so, the scrambling or descrambling scheme is modified dynamically in step 908 with respect to the subsequent encoding or decoding of client signals in step 910.

Note that multiple conditions may be met, even at the same time. So, whether or not the encoding/decoding condition is met in step 905 (and, if so, handled in step 908), processing also returns to step 915 to determine whether a condition relating to the data line rate is met. If so, then the data line rates of one or more client signals is modified dynamically in step 918 with respect to the subsequent buffering and synchronization (on the Tx or Rx side) of client signals in step 920.

Here too, whether or not the condition in step 915 is met, processing also returns to step 925 to determine whether a condition is met relating to the mapping or demapping of ITU channels and subchannels. If so, then such mapping or demapping assignments are modified dynamically in step 928 with respect to the subsequent mapping or demapping of ITU channels and subchannels in step 930.

Once again, whether or not the condition in step 925 is met, processing also returns to step 935 to determine whether a condition is met relating to lambda drift. If so, then a shift in the subcarrier frequencies within an ITU window is introduced in step 938. Depending on the timing of the conditions, processing also returns to steps 945 and 955, respectively (in order, in this embodiment) to determine whether a condition is met relating respectively to polarization and modulation schemes. Whether one or more of the conditions in steps 935, 945 and 955 are met (triggering lambda shifts in step 938, polarization state modifications in step 948 and changes in modulation schemes in step 958), processing proceeds to step 960 where these modifications are implemented during the modulation or demodulation of ITU channels and subchannels onto/from laser frequencies.

It should be noted that, in other embodiments, additional conditions could be included and the conditions could be checked and processed in combination as well as in a different order. Once all conditions have been checked, processing returns to step 901 to continue checking for dynamic modification conditions that may occur over time. Processing of transmit and receive functions (steps 910, 920, 930, 960 and 970) also continues in parallel.

It should be emphasized that various modifications and combinations of the above-described embodiments can be employed without departing from the spirit of the present invention, including without limitation using ITU channels in lieu of subchannels, using virtually any number of subchannels within or across ITU channels, using various different modulation schemes, altering the conditions (random, periodic, detection of intrusion, etc) under which particular schemes are employed, as well as employing different methods of communicating among network nodes which scheme (and associated algorithm) will be used at any given time.

The invention claimed is:

1. A method of providing security at the physical layer of an optical network by processing client signals for transmission on a fiber optic cable of the optical network, the fiber optic cable carrying a plurality of ITU (International Telecommunications Union) channels, each ITU channel having a corresponding ITU carrier frequency and a plurality of subchannels, each of the subchannels having a corresponding subcarrier frequency within that ITU channel, the method comprising the following steps:

(a) encoding a plurality of client signals;

(b) buffering and synchronizing the encoded client signals;

(c) mapping the buffered and synchronized encoded client signals to respective subchannels of the ITU channels, wherein each subchannel of the ITU channels corresponds to a subcarrier frequency of its corresponding ITU carrier frequency, and wherein each subcarrier frequency of its corresponding ITU carrier frequency is generated by a separate distinct laser;

(d) modulating each subchannel of the ITU channels onto the subcarrier frequency of its corresponding ITU carrier frequency;

(e) multiplexing together those subchannels of the ITU channels whose corresponding frequencies fall within the same ITU channel to create a plurality of ITU channel signals, and multiplexing the ITU channel signals to generate and transmit an optical signal along the fiber optic cable of the optical network; and (f) modifying dynamically over time one or more of the processing steps (a)-(e).

2. The method of claim 1, wherein one or more of the dynamic modifications are triggered randomly over time.

3. The method of claim 1, wherein one or more of the dynamic modifications are triggered in response to a predetermined condition.

4. The method of claim 3, wherein the predetermined condition includes detection of an intrusion into the optical network.

5. The method of claim 1, wherein the encoding of the client signals is modified dynamically by alternating between ITU scrambling standards G.709 and G.975.

6. The method of claim 1, wherein the buffering and synchronizing of the encoded client signals is modified dynamically by changing a data rate of one or more encoded client signals.

7. The method of claim 1, wherein the mapping of the buffered and synchronized encoded client signals is modified dynamically by remapping one or more buffered and synchronized encoded client signals to a different subchannel within the same ITU channel, or to a subchannel within a different ITU channel.

8. The method of claim 1, wherein the modulation of each subchannel is modified dynamically to introduce a lambda drift of its corresponding subcarrier frequency within an ITU channel window.

9. The method of claim 1, wherein the modulation of each subchannel is modified dynamically by changing a polarization state of its corresponding subcarrier frequency.

10. The method of claim 1, wherein the modulation of each subchannel is modified dynamically by changing a modulation scheme.

11. A method of providing security at the physical layer of an optical network by processing an optical signal received on a fiber optic cable of the optical network, the fiber optic cable carrying a plurality of ITU (International Telecommunications Union) channels, each ITU channel having a corresponding ITU carrier frequency and a plurality of subchannels, each of the subchannels having a corresponding subcarrier frequency within that ITU channel, the method comprising the following steps:

(a) receiving the optical signal along the fiber optic cable, demultiplexing the received optical signal into a plurality of ITU channels, and demultiplexing each ITU channel into a plurality of subcarrier frequencies of its corresponding ITU carrier frequency, each subcarrier frequency representing a corresponding subchannel within that ITU channel;

(b) demodulating each subcarrier frequency of the ITU carrier frequencies into its corresponding subchannel of the ITU channels;

(c) demapping each subchannel of the ITU channels into a buffered and synchronized encoded client signal, wherein each subchannel of the ITU channels corresponds to a subcarrier frequency of its corresponding ITU carrier frequency, and wherein each subcarrier frequency of its corresponding ITU carrier frequency is generated by a separate distinct laser;

(d) extracting an encoded client signal from each buffered and synchronized encoded client signal;

(e) decoding each encoded client signal; and (f) modifying dynamically over time one or more of the processing steps (a)-(e).

12. The method of claim 11, wherein one or more of the dynamic modifications are triggered periodically over time.

* * * * *